United States Patent Office 2,748,124
Patented May 29, 1956

2,748,124

1-(4-ANILINO-2-PYRIMIDINO)-3-ALKYLUREAS

Robert R. Burtner, Skokie, Ill., assignor, by mesne assignments, to G. D. Searle & Co., Skokie, Ill., a corporation of Delaware No Drawing. Application May 6, 1954,
Serial No. 428,136

8 Claims. (Cl. 260—256.4)

The present invention relates to 1-pyrimidino-3-alkylureas and processes for the manufacture thereof. More particularly, this invention relates to 1-(4-anilino-2-pyrimidino)-3-alkylureas of the formula

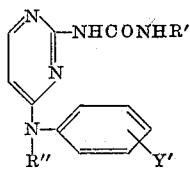

wherein R' is a lower alkyl radical containing less than 6 carbon atoms, Y' is hydrogen or a lower alkoxyl radical containing less than 6 carbon atoms, and R" is hydrogen or a lower alkyl radical containing less than 6 carbon atoms.

In the foregoing structural formula, the radicals R' and R" represent such lower alkyl radicals as methyl, ethyl, propyl, isopropyl, butyl, isobutyl, secondary butyl, tertiary butyl, amyl, secondary normal amyl, primary isoamyl, secondary isoamyl, and tertiary amyl radicals. Similarly, the alkoxyl radicals comprehended by Y' are those wherein the alkyl constituents are of the type hereinbefore recited, namely, methyl, ethyl, propyl, isopropyl, and like $C_nH_{2n+1}$ radicals, either straight- or branched-chained, containing not more than 5 carbon atoms.

Equivalent to the basic urea derivatives of this invention and likewise adapted to its uses are the non-toxic acid addition salts formed by interaction of the claimed compounds with inorganic and strong organic acids. Representative of such salts are compositions of the formula

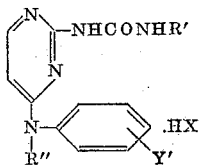

wherein R', Y' and R" are defined as above and X is one equivalent of an anion—for example, chloride, bromide, iodide, methyl sulfate, ethyl sulfate, benzenesulfonate, toluenesulfonate, tartrate, succinate, malate, acetate, citrate, nitrate, sulfate, phosphate, sulfamate, and the like—which in combination with the cationic portion of a salt aforesaid is neither pharmacologically nor otherwise undesirable in pharmaceutical dosage.

The compounds of this invention are useful in medicine for the treatment of disease and the relief of conditions inimical to the well-being of the animal body. For example, the claimed compounds show appreciable chemotherapeutic promise in the field of cardiac pathology. In particular, they are valuable because of their digitalis-like activity, manifesting marked capacity for myocardial stimulation in instances of insufficiency associated with the failing heart.

The basic urea derivatives which serve the purposes of this invention are relatively insoluble in water but may be dissolved in dilute acids and in most of the common organic solvents. The equivalent addition salts are, on the other hand, comparatively soluble in water and in aqueous solutions of alcohols or other water-miscible organic solvents. The subject compounds may be administered in solid form as tablets; dissolved or suspended in aqueous media, they may be given parenterally.

The compounds to which this invention relates are conveniently prepared in accordance with the following procedure: A 2-amino-4-halopyrimidine—for example, 2-amino-4-chloropyrimidine—is reacted with aniline or an appropriately N-alkyl and/or o-, m, or p-alkoxyl-substituted aniline (as indicated) to give a 2-anilino-pyrimidine derivative. The reaction is carried out in aqueous solution, using a small amount of mineral acid as a catalyst, and is ordinarily completed in from 15 minutes to 3 hours at temperatures between 80° and 130° centigrade. The anilinopyrimidine derivative thus obtained is, in turn, converted to one of the substituted ureas of this invention by interaction in a relatively non-polar inert organic solvent—such as toluene or dioxane—with an alkyl isocyanate, reaction taking place in from 6 to 18 hours at temperatures of the order of 85° to 120° centigrade. Conversion of the amine bases to the corresponding acid addition salts is accomplished by simple admixture of the said compounds with one equivalent of a selected acid.

The following examples will illustrate in detail certain of the compounds which constitute the present invention and methods which have been devised for their preparation. However, the invention is not to be construed as limited thereby, either in spirit or in scope, since it will be apparent to those skilled in the art of organic synthesis that many modifications, both of materials and of methods, may be practiced without departing from the purpose and intent of this disclosure. In the examples hereinafter detailed, temperatures are given in degrees centigrade (° C.), pressures in millimeters (mm.) of mercury, and relative amounts of materials in parts by weight, except as otherwise noted.

Example 1

A. *2-amino-4-(N-ethylanilino)-pyrimidine.*—A mixture of 143 parts of 2-amino-4-chloropyrimidine, 133 parts of N-ethylaniline, and 13 parts of muriatic acid in 1100 parts of water is heated at reflux temperatures for 30 minutes. The reactants are thereupon cooled and made alkaline with an excess of 50% aqueous caustic soda. An oil is thrown down, which crystallizes on standing with agitation. The solid product is filtered out, rinsed with water, and dried at 75° C., in that order. The 2-amino-4-(N-ethylanilino)-pyrimidine thus obtained shows M. P. 142–144° C. Crystallization from approximately 5 volumes of toluene, using decolorizing charcoal in process, yields dense white crystals, the melting point of which remains substantially unchanged. The product is soluble in dilute muriatic acid.

B. *1-[4-(N-ethylanilino)-2-pyrimidino]-3-ethylurea.*— A solution of 41 parts of the amino compound of the foregoing Part A and approximately 14 parts of ethyl isocyanate in 435 parts of dry toluene is heated at reflux temperatures for 12 hours, following which the mixture is chilled and then filtered. The crystalline product thus removed is rinsed with a small amount of toluene and finally dried at 75° C. Recrystallization from approximately 10 volumes of ethanol affords pure white 1-[4-(N- ethylanilino)-2-pyrimidino]-3-ethylurea, M. P. 186–187° C. The product has the formula

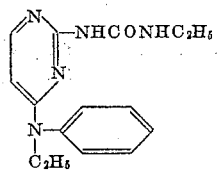

*Example 2*

A. *2-amino-4-p-phenetidinopyrimidine.*—A mixture of 258 parts of 2-amino-4-chloropyrimidine, 274 parts of p-phenetidine, and 24 parts of muriatic acid in 2000 parts of water is heated at reflux temperatures for 30 minutes. The resultant clear yellow solution is cooled and then treated with an excess of 50% aqueous caustic soda. The crystalline precipitate which forms is isolated and subsequently purified by recrystallization from 1900 parts of ethanol, using decolorizing charcoal in process. The colorless 2-amino-4-p-phenetidinopyrimidine thus obtained shows M. P. approximately 163° C.

B. *1-[4-(p-phenetidino)-2-pyrimidino]-3-ethylurea.*— A solution of approximately 46 parts of the amino compound of the preceding Part A and 14 parts of ethyl isocyanate in 500 parts of dry dioxane is refluxed for 12 hours. Upon chilling, a precipitate is thrown down which, recrystallized from approximately 1000 parts of ethanol (using decolorizing charcoal in process), shows M. P. approximately 218° C. The feathery white needles of 1-[4-(p-phenetidino)-2-pyrimidino]-3-ethylurea thus obtained are soluble in warm dilute muriatic acid. The product has the formula

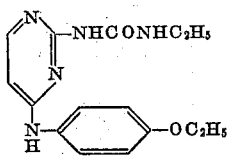

I claim:
1. A compound of the formula

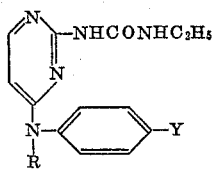

wherein Y is selected from the group consisting of hydrogen and lower alkoxyl radicals containing less than 3 carbon atoms, and R is selected from the group consisting of hydrogen and lower alkyl radicals containing less than 3 carbon atoms.

2. A compound of the formula

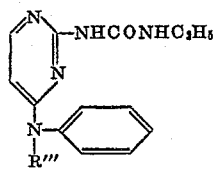

wherein R''' is a lower alkyl radical containing less than 3 carbon atoms.

3. 1-[4-(N-ethylanilino)-2-pyrimidino]-3-ethylurea.

4. A compound of the formula

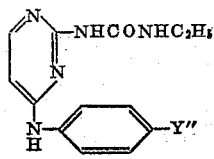

wherein Y'' is a lower alkoxyl radical containing less than 3 carbon atoms.

5. 1-[4-(p-phenetidino)-2-pyrimidino]-3-ethylurea.

6. In a process for the manufacture of compounds of the formula

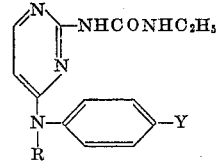

wherein Y is selected from the group consisting of hydrogen and lower alkoxyl radicals containing less than 3 carbon atoms, and R is selected from the group consisting of hydrogen and lower alkyl radicals containing less than 3 carbon atoms, the step which comprises contacting at temperatures of the order of 85–120° centigrade for periods of time amounting to between 6 and 18 hours an anilino pyrimidine of the formula

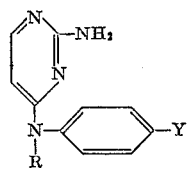

wherein Y and R have the meanings assigned above, with ethyl isocyanate, using a nonpolar organic liquid medium.

7. In a process for the manufacture of compounds of the formula

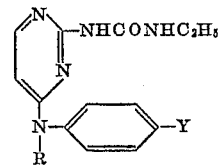

wherein Y is selected from the group consisting of hydrogen and lower alkoxyl radicals containing less than 3 carbon atoms, and R is selected from the group consisting of hydrogen and lower alkyl radicals containing less than 3 carbon atoms, the step which comprises contacting at reflux temperatures during 12 hours 2-amino-4-(N-ethylanilino)pyrimidine with ethyl isocyanate in toluene solution.

8. In a process for the manufacture of compounds of the formula

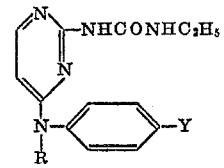

wherein Y is selected from the group consisting of hydrogen and lower alkoxyl radicals containing less than 3 carbon atoms, and R is selected from the group consisting of hydrogen and lower alkyl radicals containing less than 3 carbon atoms, the step which comprises contacting at reflux temperatures during 12 hours 2-amino-p-phenetidinopyrimidine with ethyl isocyanate in dioxane solution.

No references cited.